United States Patent
Kim et al.

(10) Patent No.: US 9,628,685 B2
(45) Date of Patent: Apr. 18, 2017

(54) COLOR FILTER ARRAY, METHOD OF MANUFACTURING THE SAME, AND IMAGE SENSOR INCLUDING THE SAME

(71) Applicant: SAMSUNG ELECTRONICS CO., LTD., Suwon-si (KR)

(72) Inventors: Doyoon Kim, Hwaseong-si (KR); Ilhwan Kim, Yongin-si (KR); Jesada Ungnapatanin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/694,649

(22) Filed: Apr. 23, 2015

(65) Prior Publication Data

US 2016/0065814 A1    Mar. 3, 2016

(30) Foreign Application Priority Data

Aug. 26, 2014 (KR) .......................... 10-2014-0111629

(51) Int. Cl.
| | |
|---|---|
| H04N 5/225 | (2006.01) |
| H04N 9/04 | (2006.01) |
| G02B 5/20 | (2006.01) |
| G02B 1/10 | (2015.01) |
| H04N 9/07 | (2006.01) |

(52) U.S. Cl.
CPC ............. *H04N 5/2254* (2013.01); *G02B 1/10* (2013.01); *G02B 5/201* (2013.01); *H04N 9/045* (2013.01); *H04N 9/07* (2013.01)

(58) Field of Classification Search
CPC ........ H04N 9/045; H04N 5/2254; G02B 1/10; G02B 5/201
See application file for complete search history.

(56) References Cited

U.S. PATENT DOCUMENTS

| | | | |
|---|---|---|---|
| 6,566,160 | B2 | 5/2003 | Yeh et al. |
| 7,652,257 | B2 * | 1/2010 | Li .......................... G01T 1/2018 250/370.01 |
| 8,208,052 | B2 | 6/2012 | Hiramoto et al. |
| 8,289,422 | B2 | 10/2012 | Hiramoto et al. |
| 8,294,076 | B2 | 10/2012 | Nishiwaki et al. |
| 8,384,818 | B2 | 2/2013 | Hiramoto et al. |
| 8,514,319 | B2 | 8/2013 | Hiramoto et al. |

(Continued)

FOREIGN PATENT DOCUMENTS

| | | |
|---|---|---|
| JP | 2002-156520 A | 5/2002 |
| JP | 2008-268699 A | 11/2008 |

(Continued)

OTHER PUBLICATIONS

Extreme Tech, http://www.extremetech.com/extreme/186229-its-like-staring-into-a-black-hole-worlds-darkest-material-will-be-used-to-make-very-stealthy-aircraft-better-telescopes, Jul. 14, 2014.*

(Continued)

*Primary Examiner* — James Hannett
(74) *Attorney, Agent, or Firm* — Sughrue Mion, PLLC

(57) ABSTRACT

A color filter array, a method of manufacturing the same, and an image sensor including the same are provided. The color filter array includes: a color filter arrangement including a plurality of color filters on a substrate; and an isolation wall which isolates each of the color filters and includes a solid including a plurality of air spaces.

14 Claims, 6 Drawing Sheets

(56) References Cited

U.S. PATENT DOCUMENTS

| | | | |
|---|---|---|---|
| 2005/0074565 A1* | 4/2005 | Cok | B82Y 10/00 |
| | | | 428/1.1 |
| 2009/0298220 A1* | 12/2009 | Anderson | H04N 5/374 |
| | | | 438/70 |
| 2010/0201251 A1* | 8/2010 | Park | B82Y 10/00 |
| | | | 313/496 |
| 2011/0059572 A1* | 3/2011 | Brady | H01L 27/1463 |
| | | | 438/72 |
| 2012/0212656 A1 | 8/2012 | Hiramoto et al. | |
| 2014/0015083 A1 | 1/2014 | Kao | |
| 2015/0311248 A1* | 10/2015 | Lee | H01L 27/14645 |
| | | | 257/432 |

FOREIGN PATENT DOCUMENTS

| | | |
|---|---|---|
| JP | 5177933 B2 | 4/2013 |
| KR | 10-2008-0094937 A | 10/2008 |
| KR | 10-2013-0124779 A | 11/2013 |

OTHER PUBLICATIONS

Tournier et al., "Pixel-to-Pixel isolation by Deep Trench technology: Application to CMOS Image Sensor", 2011, 4 pages total, International Image Center Workshop, France.

* cited by examiner (20mM, 800rpm, a)

(40mM, 800rpm, b)

COLOR FILTER ARRAY, METHOD OF MANUFACTURING THE SAME, AND IMAGE SENSOR INCLUDING THE SAME

RELATED APPLICATION

This application claims priority from Korean Patent Application No. 10-2014-0111629, filed on Aug. 26, 2014, in the Korean Intellectual Property Office, the disclosure of which is incorporated herein in its entirety by reference.

BACKGROUND

1. Field

Apparatuses and methods consistent with exemplary embodiments relate to a color filter array, a method of manufacturing the same, and an image sensor including the same.

2. Description of the Related Art

Color display apparatuses and color image sensors typically use a color filter array to display an image having multiple colors or to detect incident light of multiple colors and to control each pixel of a sensor to generate a signal corresponding to one of the three colors. Most of the current color display apparatuses and color image sensors employ a red, green, and blue (RGB) color filter wherein, for example, of each four pixels, a green filter is disposed on two of the four pixels, and a blue filter and a red filter are respectively disposed on one pixel each. As an alternative to an RGB color filter, a cyan, yellow, green, and magenta (CYGM) color filter in which cyan, yellow, green, and magenta color filters, having complementary color relationships thereamong, are respectively disposed on one of each four pixels.

However, when a color image sensor is used, light is incident onto each color filter at a certain incident angle, and thus, crosstalk between pixels may occur due to the incident angle of the light. Specifically, in the case of vertically incident light, there is no interference in which the light becomes incident on an adjacent pixel. However, a portion of the incident light may interfere with light incident on an adjacent color filter array. In addition, crosstalk may occur due not only to incident light but also to light output from an adjacent color filter array.

SUMMARY

One or more exemplary embodiments may provide a color filter array capable of preventing crosstalk and increasing optical efficiency due to use of a wall for isolating spaces between color filters, a method of manufacturing the same, and an image sensor including the same.

Additional exemplary aspects and advantages will be set forth in part in the description which follows and, in part, will be apparent from the description, or may be learned by practice of the presented embodiments.

According to an aspect of an exemplary embodiment, a color filter array includes: a color filter arrangement including a plurality of different types of color filters disposed in an array on a substrate; and an isolation wall, disposed on the substrate, wherein the isolation wall isolates each of the color filters and comprises a solid material comprising a plurality of air spaces.

The air spaces may occupy about 90% or more of the isolation wall, by volume.

The isolation wall may be disposed on the substrate in a mesh shape and the plurality of color filters are disposed in openings in the mesh shape, so that each of the color filters is surrounded by the isolation wall.

The isolation wall may be formed of nanotubes or solid nano coils formed of silver, alumina, or carbon.

The isolation wall may be formed of carbon nanotubes, the color filter array may further include a catalyst layer disposed on the substrate, and the isolation wall may be formed by growing the carbon nanotubes on the catalyst layer.

The catalyst layer may be formed using a liquid catalytic material.

The catalyst layer may be formed using $Fe(II)(CH_3COO)_2$ as the catalytic material.

According to an aspect of another exemplary embodiment, an image sensor includes: a detection element array having a two-dimensional (2D) array of detection elements for detecting light; and a color filter array comprising a plurality of color filters disposed on the detection element array in a 2D array corresponding to the 2D array of the detection element array. The color filter array comprises a plurality of different types of color filters, wherein each of the color filters transmits only light in a specific wavelength band; and an isolation wall which isolates each of the color filters and comprises a solid material comprising a plurality of air spaces.

The image sensor may further include a color separation element array having a plurality of color separation elements, ach of which separates incident light into different wavelength bands, wherein the plurality of separation elements are disposed in a 2D array, such that light in each of the different wavelength bands is onto a corresponding on e of the plurality of color filters. The plurality of color separation elements are buried within a transparent cover layer formed on the color filter array.

According to an aspect of another exemplary embodiment, a method of manufacturing a color filter array includes: forming a catalyst layer on a substrate; patterning the catalyst layer pattern into a mesh shape by coating and patterning a photoresist on the catalyst layer; forming a mesh-shaped isolation wall of a solid material including a plurality of air spaces by growing carbon nanotubes on the catalyst layer; and forming a color filter arrangement including a plurality of color filters by disposing materials for the plurality of types of color filters in openings in the mesh-shaped isolation wall.

The catalyst layer may be formed using a liquid catalytic material.

The catalyst layer may be formed by a spin coating method using $Fe(II)(CH_3COO)_2$ as a catalytic material.

A tetramethylammonium hydroxide (TMAH, $N(CH_3)_4OH$) may be used as a developing solution for patterning the catalyst layer.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
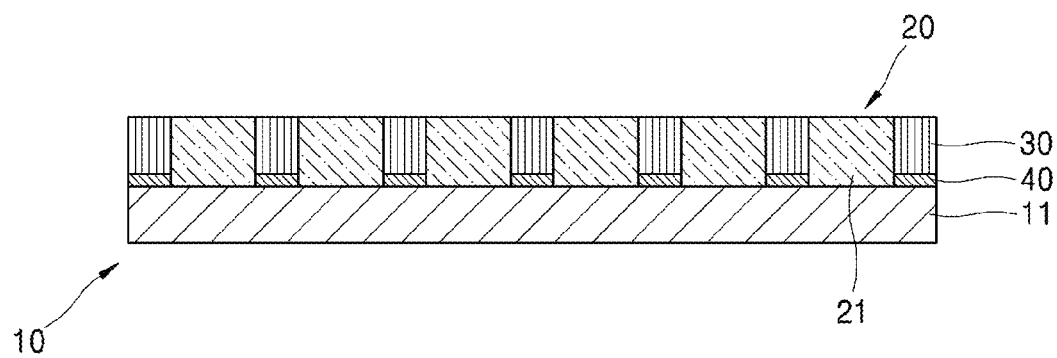
FIG. 1 is a cross-sectional diagram of a color filter array according to an exemplary embodiment.

Hereinafter, a color filter array, a method of manufacturing the same, and an image sensor including the same according to exemplary embodiments will be described in detail with reference to the accompanying drawings, wherein like reference numerals refer to like elements throughout, and in the drawings, the thicknesses or sizes of layers are exaggerated for convenience and clarity of description. In addition, the embodiments described below are only illustrative, and various modifications may be performed from these embodiments. In addition, in the layer structure described below, the expression of "above" or "on" may include both the expression of contacting and directly on and the expression of on without contacting.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the embodiments are merely described below, by referring to the figures, to explain aspects of the present description.

A color filter array according to one or more exemplary embodiments prevents crosstalk between adjacent color filters by including an isolation wall between the color filters, the isolation wall being formed of an isolation material having a low refractive index and a porous form.

FIG. 1 is a cross-sectional diagram of a color filter array 10 according to an exemplary embodiment.

Referring to FIG. 1, the color filter array 10 includes: a color filter arrangement 20 having a plurality of different types of color filters 21 arranged on a substrate 11; and an isolation wall 30 separates the color filters 21 of the color filter arrangement 20 and isolates them from each other. The isolation wall may be a solid material including air spaces therewithin.

The color filter arrangement 20 may include, for example, a plurality of red color filters (R), a plurality of green color filters (G), and a plurality of blue color filters (B). The color filter arrangement 20 may be formed such that a plurality of basic units are arranged in a two-dimensional array, where each basic unit includes, for example, four pixels including a red color filter (R), two green color filters (G), and a blue color filter (B). For example, the color filter arrangement 20 may be an RGB color filter in which four pixels form a basic unit and a red color filter (R), two green color filters (G), and a blue color filter (B) are disposed on respective pixels. Alternatively, the color filter arrangement 20 may be a CYGM color filter in which four pixels form a basic unit, and cyan (C), yellow (Y), green (G), and magenta (M) color filters are disposed on the respective pixels. Alternately, the color filter arrangement 20 may be formed according to any of various other arrangements.

The isolation wall 30 may be a solid including at least one air space therewithin. The isolation wall may prevent crosstalk between the color filters 21 by providing isolating spaces between the color filters 21.

The isolation wall 30 may be formed of, for example, a solid material in which air spaces occupy about 90% or more thereof by volume. For example, the isolation wall 30 may be formed of carbon nanotubes (CNTs) or solid nano coils. In addition, the isolation wall 30 may be a mesh shape. In this case, the color filter arrangement 20 may be formed by disposing materials for the plurality of different types of color filters 21 within openings within the mesh-shaped isolation wall 30.

When the isolation wall 30 is formed of CNTs, a catalyst layer 40 may also be formed on the substrate 11. In this case, the isolation wall 30 may be formed by growing CNTs on the catalyst layer 40.

The catalyst layer 40 may be formed by spin-coating a liquid catalyst and patterning a catalyst layer formed by using, for example, iron acetate ($Fe(II)(CH_3COO)_2$) as a catalytic material so that an isolation pattern having a desired shape is easily formed via a chemical reaction of the liquid catalyst. For example, the catalyst layer 40 may be formed with a desired catalyst thickness on a silicon substrate by a spin coating method.

When the catalyst layer 40 is patterned into a mesh shape, so that roughly quadrilateral portions from which the catalyst layer 40 is removed, form an array, and CNTs are synthesized on the patterned mesh-shaped catalyst layer 40, the mesh-shaped isolation wall 30 formed of the CNTs may be formed. When the mesh-shaped isolation wall 30 is formed by growing CNTs on the catalyst layer 40, the isolation wall 30 formed of the CNTs may have air spaces that occupy about 90% or more thereof by volume, and accordingly, a refractive index of the isolation wall 30 may be close to 1. That is, due to the isolation walls having a refractive index close to 1, a difference between the refractive index of the isolation wall 30 and that of the color filters 21 may be large, thus providing an optical confinement effect and preventing crosstalk of incident light between adjacent color filters 21. Thus, the light use efficiency of the color filter array 10 may be improved.

A percentage of the air space in the isolation wall 30 formed of CNTs may be determined in the forming of the catalyst layer 40. When a liquid catalyst is used, the density of CNTs thereon is adjustable by, for example, adjusting a concentration of iron acetate, and accordingly, a ratio of the CNTs to air space may be adjusted.

Air or a vacuum may be an ideal material for isolating color filters. However, it is difficult to create such isolation walls in the manufacturing process, and also, it is difficult to perform post-manufacturing processes on such isolation walls. Therefore, a solid material with a refractive index close to 1 may be successfully used as an isolation material for a color filter.

In the color filter array 10 according to an exemplary embodiment, CNTs grown to form the isolation wall 30 may include about 90% or more air by volume while also having an excellent mechanical strength. Thus, crosstalk between the color filters 21 may be prevented, light use efficiency may be improved, and, there is no difficulty in performing post-manufacturing processes.

Figure 2:
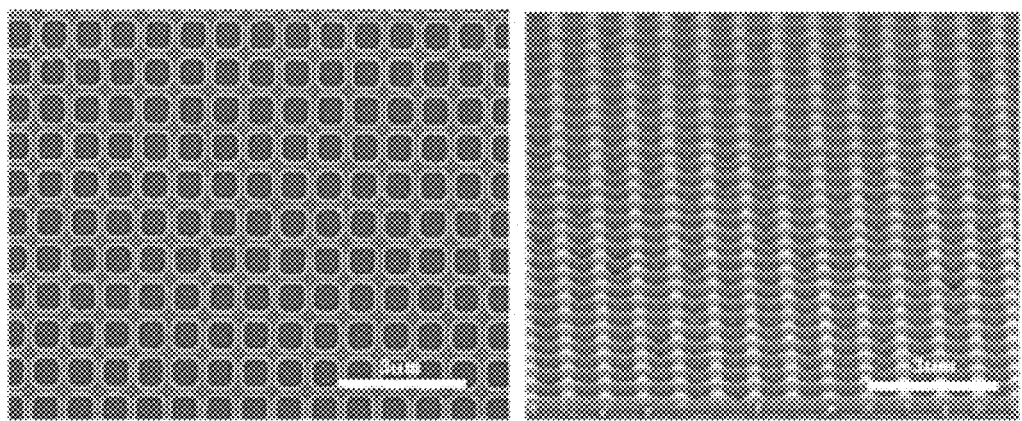
FIG. 2 illustrates scanning electron microscopic (SEM) images of carbon nanotube patterns grown in a mesh shape.

FIG. 2 illustrates scanning electron microscopic (SEM) images of CNTs pattern-grown in a mesh shape. As shown in FIG. 2, when the catalyst layer 40 is patterned and removed to create a quadrilateral mesh shape, and CNTs are pattern-grown on the mesh-shaped catalyst layer 40 by low-temperature growth, the CNTs can be synthesized into the mesh shape. By doing this, the color filters 21 may be separated from one another by the CNTs. In this case, the length and width of the CNTs are related to the resultant height and isolation gap of the color filters 21 and may be adjusted by adjusting a synthesizing time and a width of the pattern when forming the pattern. For example, the isolation wall 30 formed of CNTs may be formed so as to have a geometric shape with a width of about 150 to about 180 nm and a height of about 800 nm, and the color filters 21 may be formed using the CNT separator formed as described above.

Figure 3:
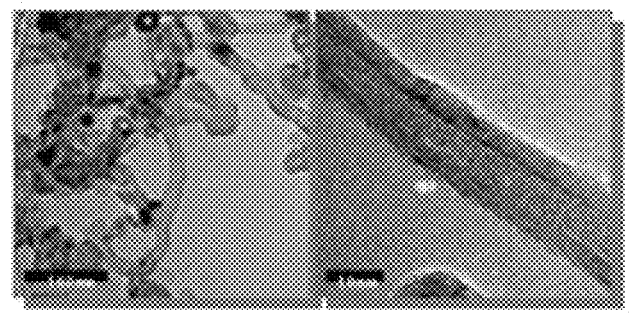
FIG. 3 illustrates SEM images of carbon nanotubes grown for each concentration of a liquid catalyst.
Figure 3:
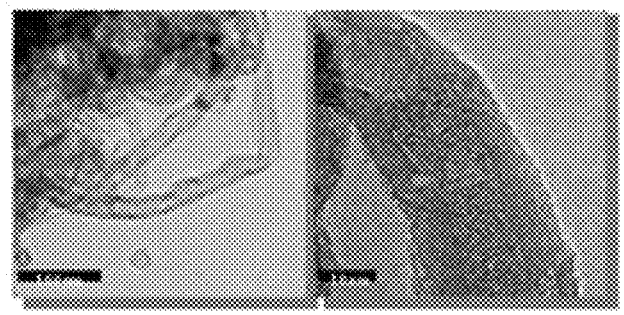

FIG. 3 illustrates SEM images of CNTs grown using different concentrations of a liquid catalyst. The upper image shown in FIG. 3 is an image of CNTs grown when the catalyst layer 40 is formed by spin-coating a liquid catalyst of 20 mM at 800 rpm. The lower image shown in FIG. 3 is an image of CNTs grown when the catalyst layer 40 is formed by spin-coating a liquid catalyst of 40 mM at 800 rpm. As shown in the two images, when the concentration of the liquid catalyst is varied, a carbon layer formed on an outer wall of a resultant CNT varies, as well as a size of an inner hole of the resultant CNT. That is, the ratio of air to carbon may be adjusted according to the concentration of the liquid catalyst. In addition, a density of catalyst particles may be adjusted by increasing or decreasing the number of revolutions per minute (rpm) during spin coating. As shown from the images in FIG. 3, a ratio of air space to solid may be adjusted by changing process conditions such as the concentration of the liquid catalyst, the number of rpm during spin coating, and the like. Thus, according to an exemplary embodiment, optical characteristics of the color filter array 10 may be adjusted during the manufacturing process.

Although a case in which the isolation wall 30 is formed of CNTs has been described and shown via the examples above, the present exemplary embodiment is not limited thereto, and any material capable of being manufactured in a nanotube shape with a low refractive index may be used as a material for isolating the color filters 21.

For example, the isolation wall 30 may be formed of nanostructures formed of silver (Ag) or alumina ($Al_2O_3$). Since silver or alumina has a low refractive index and may be formed into a hollow tube shape using a synthesis method, silver or alumina nanostructures may exhibit the characteristics similar to those of CNTs with respect to the present embodiment. For example, silver may exhibit a refractive index of about 0.130 at a wavelength of about 550 nm, and alumina may exhibit a refractive index of about 1.770 at the wavelength of about 550 nm.

Thus, even when the isolation wall 30 is formed of silver or alumina nanostructures, the resulting material may be formed so that air occupies, for example, about 90% or more of the isolation wall 30, by volume.

FIGS. 4 to 9 are cross-sectional diagrams for describing a method of manufacturing the color filter array 10 shown in FIG. 1, according to an exemplary embodiment. FIGS. 4 to 9 illustrate a method of forming the isolation wall 30 that includes CNTs and applying the catalyst layer 40 to grow the CNTs, according to an exemplary embodiment. The color filter array 10 according to an exemplary embodiment may be manufactured by any of various methods, and this exemplary embodiment is merely provided herein for illustrative purposes. Thus, the color filter array 10 may be formed by another method.

Figure 4:
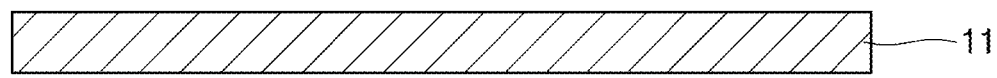
FIGS. 4 through 9 are cross-sectional diagrams for describing a method of manufacturing the color filter array shown in FIG. 1, according to an exemplary embodiment.

Referring to FIG. 4, first, the substrate 11 is prepared. The substrate 11 may be any one of various types of substrates used in the manufacture of semiconductors, e.g., a substrate on which a detection element array of an image sensor is arranged.

Figure 5:
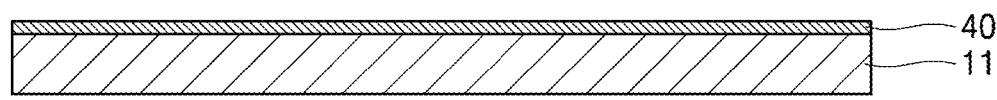
Figure 6:
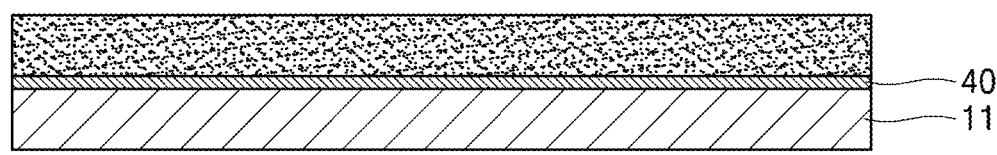

Next, as shown in FIGS. 5 and 6, the catalyst layer 40 is formed on the prepared substrate 11, and a photoresist 45 is coated on the catalyst layer 40.

The catalyst layer 40 may be formed using a liquid catalyst material. For example, the catalyst layer 40 may be formed by a spin coating method using iron acetate (Fe(II) $(CH_3COO)_2$) as a catalytic material. Accordingly, the catalyst layer 40 may be formed of, for example, $(C_2H_3O_2)_2Fe$.

As described above, when a liquid catalyst material is used, an isolation pattern having a desired shape may be easily formed via the chemical reaction of the liquid catalyst, and thus, the process may be simplified.

Figure 7:
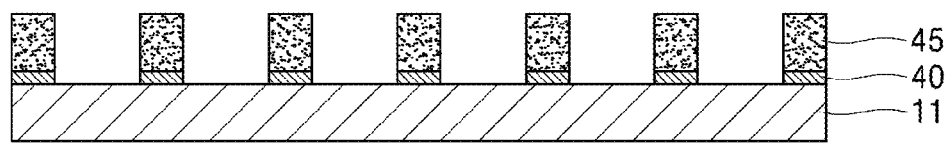

Next, as shown in FIG. 7, through a developing process, a pattern of the catalyst layer 40 having a mesh shape is formed to have a width desired for separating the color filters 21. In this case, as a developing solution for patterning the catalyst layer 40, a tetramethylammonium hydroxide (TMAH, $N(CH_3)_4OH$) solution that is an alkaline solution may be used so as to enable a reaction with the catalyst layer 40 through an acid-base reaction. The catalyst layer 40 is patterned during a developing process through the acid-base reaction. In this case, a sediment of ferrous hydroxide ($Fe(OH)_2$) is generated as a by-product in a reaction between the base OH– in the TMAH and $Fe^{2+}$ in the iron acetate used as a catalyst, and the sediment of $Fe(OH)_2$ may also be removed during the developing process.

Figure 8:
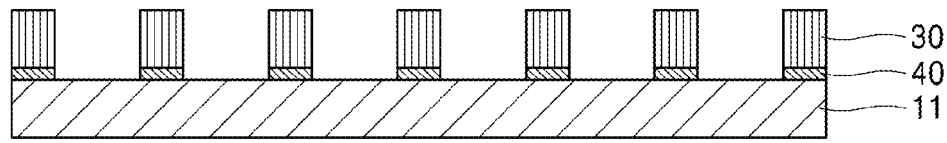

Next, the photoresist 45 remaining on the patterned catalyst layer 40 is removed, and as shown in FIG. 8, CNTs are pattern-grown on the catalyst layer 40 by low-temperature growth and may be synthesized in a mesh shape. Thus, the mesh-shaped isolation wall 30 may be formed. In this case, the isolation wall 30 formed of CNTs has an air space of about 90% or more but may sufficiently function as a support layer for performing a post-process because of an excellent mechanical strength of the CNTs.

Figure 9:
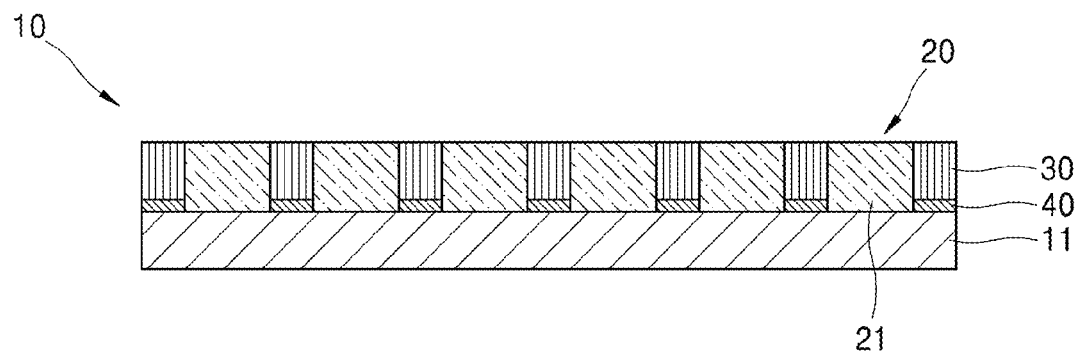

Next, referring to FIG. 9, the color filter arrangement 20, including color filters to be surrounded by the isolation wall 30, are formed by disposing filling materials, for each of the plurality of different types of color filters 21, in the openings in the mesh-shaped isolation walls. Accordingly, the color filter array 10 according to an exemplary embodiment may be obtained.

According to the exemplary embodiments described above, a reflection ratio of a CNT is about 1.4% at a wavelength of about 450 to about 700 nm, and since a percentage of an air space is higher than a percentage of CNTs, by volume, in the isolation wall 30, the role of the isolation wall 30 is mostly performed by the air space. That is, since the air space occupying 90% or more, by volume, of the isolation wall 30 ideally has a refractive index of about n=1, the overall refractive index of the isolation wall 30 is much less than that of the color filters 21. Accordingly, the color filters 21 may be isolated from one another, thereby preventing crosstalk between adjacent color filters 21 and contributing to an improvement in the optical efficiency of the color filter array 10 due to an optical confinement effect.

Figure 10:
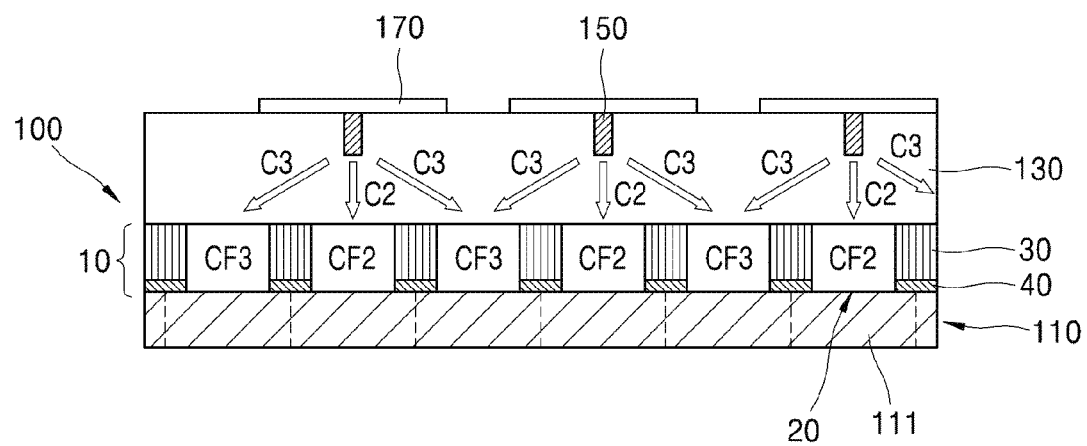
FIG. 10 is a cross-sectional diagram of an image sensor including a color filter array, according to an exemplary embodiment.
Figure 11:
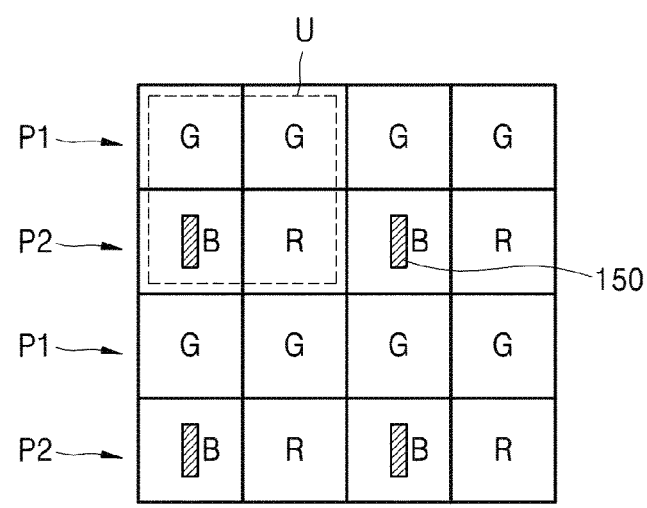
FIG. 11 illustrates a position relationship between color filters of a color filter array and color separation elements in the image sensor of FIG. 10.

FIG. 10 is a cross-sectional diagram of an image sensor 100 including the color filter array 10, according to an exemplary embodiment. Herein, components substantially the same as those in FIG. 1 are referred to by the same reference numerals, and repetitive descriptions thereof are omitted. FIG. 11 illustrates a positional relationship between the color filters 21 of the color filter array 10 and color separation elements 150 in the image sensor 100 shown in FIG. 10.

Referring to FIGS. 10 and 11, the image sensor 100 may include a detection element array 110 disposed on the substrate 11 and the color filter array 10 arranged on the detection element array 110. The image sensor 100 may further include a color separation element array.

The detection element array 110 may include detection elements 111, for detecting light, arranged in a 2D pixel arrangement.

The color filter array 10 includes: the color filter arrangement 20 including the plurality of different types of color filters 21; and the isolation wall 30 for isolating spaces between the color filters 21, the isolation wall 30 comprising a solid material with air spaces therewithin. The color filter array 10 is as described above with reference to FIGS. 1 to 9.

The color filter array 10 may be formed such that, for example, a first color filter CF1, e.g., a green color filter (G), is arranged in a first pixel row p1, extending in a first direction; a second color filter CF2 and a third color filter CF3, e.g., a red color filter (R) and a blue color filter (B), are arranged in a second pixel row p2, extending in the first direction; and the first pixel row p1 and the second pixel row p2 are alternately arranged in a second direction, perpendicular to the first direction. However, the arrangement of the color filters 21 of the color filter array 10 may be modified in any of various ways.

The color separation element array includes a plurality of color separation elements 150 which are two-dimensionally arranged, wherein each of the color separation elements 150 separates incident light according to wavelength, so that light of different wavelengths is incident onto different pixels, respectively, of the detection element array 110. The plurality of color separation elements 150 may be disposed within a transparent cover layer 130 formed on the color filter array 10. In this case, a micro lens 170 may be further included on the transparent cover layer 130 so as to concentrate incident light onto the color separation elements 150.

Referring to FIG. 11, the color separation elements 150 may be provided so as to separate incident light according to wavelength, e.g., into light C2 mainly including blue light and light C3 mainly including red light. To this end, the color separation elements 150 are disposed on in the second pixel row p2 including the arrangement of blue color filters (B) and red color filters (R), and are not arranged in the first pixel row p1 including the green color filters (G). In this case, only light in a blue wavelength band, that is the light C2, is transmitted through the blue color filter (B) and is detected by a corresponding detection element 111. Also, only light in a red wavelength band, that is the light C3, is transmitted through the red color filter (R) and is detected by a corresponding detection element 111. In FIG. 11, a reference sign "U" indicates a basic unit of the color filter arrangement 20 including four pixels including a red color filter (R), two green color filters (G), and a blue color filter (B).

Of the light incident onto a region of the first pixel row p1, only light in a green wavelength band is transmitted through the green color filter (G) and is detected by a corresponding detection element 111.

As shown in FIGS. 10 and 11, when the positional relationship between the color filters 21 of the color filter array 10 and the color separation elements 150 is fixed, only about ⅓ the light incident onto the first pixel row p1 is transmitted through the green color filters (G) and is detected by corresponding detection elements 111, and, since the blue light and the red light of the light incident onto the second pixel row p2 is separated by the color separation elements 150 and respectively transmitted to the blue color filters (B) and the red color filters (R), the blue light and the red light is transmitted through the blue color filters (B) and the red color filters (R), respectively, almost without loss and is detected by corresponding detection elements 111.

Therefore, the image sensor 100 including the color filter array 10 according to an exemplary embodiment may prevent crosstalk between the color filters 21 and may also exhibit higher optical detection efficiency when the color separation elements 150 are further included in addition to the color filter array 10, compared to a case in which only the color filter array 10 is included.

An image sensor 100 having the color filter array 10 according to an exemplary embodiment may be applied to an image pickup device. In this case, the image pickup device may include an object lens in front of the image sensor 100 and may be provided so that light concentrated by the object lens is detected by the image sensor 100 and converted into an electrical image signal.

Although the arrangement of the color filters 21 of the color filter array 10 according to an exemplary embodiment and the arrangement of the color separation element array have been described with reference to FIG. 11, these arrangements are only illustrative, the embodiments are not limited thereto and various modifications and other embodiments may be carried out.

As described above, according to one or more of the above exemplary embodiments, a color filter array includes an isolation wall for isolating color filters from one another, the isolation wall being in the form of a solid material including air spaces therewithin, and thus, crosstalk between the color filters may be prevented and optical efficiency may be improved.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the embodiments as defined by the following claims.

What is claimed is:
1. A color filter array comprising:
a color filter arrangement comprising a plurality of color filters disposed in an array on a substrate; and
an isolation wall disposed on the substrate, wherein the isolation wall is disposed in a same plane as the color filter arrangement and isolates each of the color filters from each other of the color filters and comprises a solid material comprising a plurality of air spaces therewithin;
wherein:
the isolation wall is formed of carbon nanotubes,
the color filter array further comprises a catalyst layer, formed using $Fe(II)(CH_3COO)_2$, disposed on the substrate, and
the carbon nanotubes of the isolation wall are grown on the catalyst layer.

2. The color filter array of claim 1, wherein the plurality of air spaces occupies about 90% or more of the isolation wall by volume.

3. The color filter array of claim 1, wherein the isolation wall is disposed on the substrate in a mesh shape and the plurality of color filters are disposed within openings in the mesh shape of the isolation wall.

4. The color filter array of claim 1, wherein the carbon nanotubes are formed of silver, alumina, or carbon.

5. An image sensor comprising:
   a detection element array comprising a two-dimensional (2D) array of detection elements; and
   a color filter array comprising a plurality of color filters disposed on the detection element array in a 2D array corresponding to the 2D array of the detection element arrays,
   wherein the color filter array comprises:
   a color filter arrangement comprising a plurality of color filters, wherein each of the color filters transmits only light in a specific wavelength band;
   an isolation wall which is disposed in a same plane as the color filter array and which isolates each of the color filters from each other of the color filters and comprises a solid material comprising a plurality of air spaces therewithin;
   a transparent cover layer disposed on the color filter array; and
   a plurality of color separation elements, wherein each of the color separation elements separates incident light into different wavelength bands, and wherein the plurality of color separations elements are disposed in a 2D array, within the transparent cover layer, such that light in each of the different wavelength bands is incident on a corresponding one of the plurality of color filters.

6. The image sensor of claim 5, wherein the plurality of air spaces occupies about 90% or more of the isolation wall by volume.

7. The image sensor of claim 5, wherein the isolation wall is formed in a mesh shape and the plurality of color filters are disposed within openings in the mesh shape of the isolation wall.

8. The image sensor of claim 5, wherein the isolation wall is formed of nanotubes or solid nano coils formed of silver, alumina, or carbon.

9. The image sensor of claim 5, further comprising a catalyst layer,
   wherein the isolation wall is formed of carbon nanotubes grown on the catalyst layer.

10. The image sensor of claim 9, wherein the catalyst layer is formed using a liquid catalytic material.

11. The image sensor of claim 10, wherein the liquid catalytic material is $Fe(II)(CH_3COO)_2$ as a catalytic material.

12. A method of manufacturing a color filter array, the method comprising:
    forming a catalyst layer on a substrate;
    patterning the a catalyst layer into a mesh shape by coating and patterning a photoresist on the catalyst layer;
    forming a mesh-shaped isolation wall of a solid material comprising a plurality of air spaces by growing carbon nanotubes on the catalyst layer; and
    forming a color filter arrangement comprising a plurality of color filters by disposing materials for the plurality of color filters in openings in the mesh-shaped isolation wall, such that the mesh-shaped isolation wall and the color filter arrangement are in a same plane and such that the mesh-shaped isolation wall isolates each of the color filters from each other of the color filters;
    wherein the forming the catalyst layer comprises spin coating $Fe(II)(CH_3COO)_2$ on the substrate.

13. The method of claim 12, wherein the patterning the catalyst layer comprises using a tetramethylammonium hydroxide (TMAH, $N(CH_3)_4OH$) as a developing solution.

14. The method of claim 12, wherein the plurality of air spaces occupies about 90% or more of the isolation wall by volume.

* * * * *